J. M. McCLAIN.
HARROW.
APPLICATION FILED OCT. 2, 1913.
1,119,975.
Patented Dec. 8, 1914.
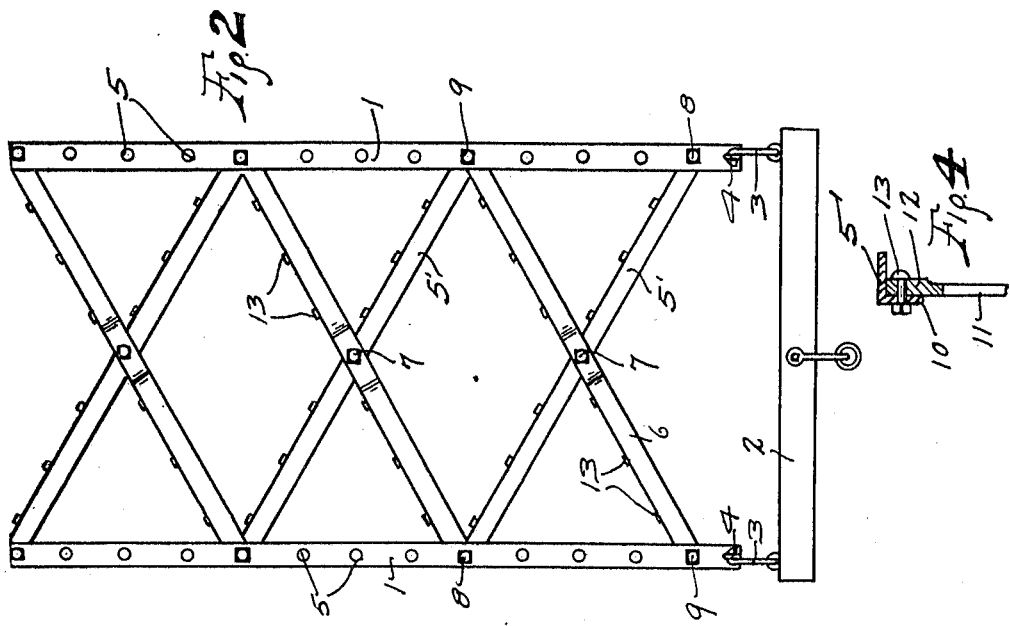
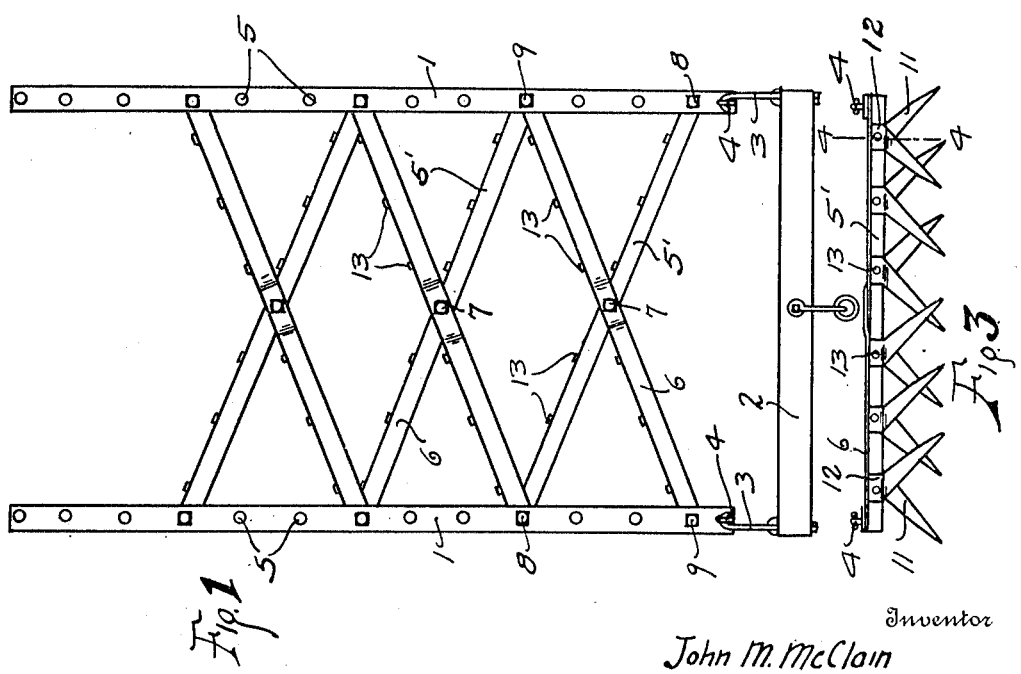
Witnesses
Harold Scantlebury
Edna Broyles
Inventor
John M. McClain
By Herbert E. Smith
Attorney

UNITED STATES PATENT OFFICE.

JOHN MARION McCLAIN, OF BOVILLE, IDAHO.

HARROW.

1,119,975.  Specification of Letters Patent.  Patented Dec. 8, 1914.

Application filed October 2, 1913. Serial No. 793,001.

*To all whom it may concern:*

Be it known that I, JOHN MARION MC-CLAIN, a citizen of the United States, residing at Boville, in the county of Latah and State of Idaho, have invented a new and useful Harrow, of which the following is a specification.

This invention relates to improvements in harrows and one of the objects is to provide a harrow having a frame of sufficient flexibility to accommodate itself to undulating surfaces over which it is drawn so that all of the teeth carried thereby will have a uniform ground smoothing or harrowing action.

Other features of novelty will be more fully described in connection with the accompanying drawing and will be more particularly pointed out in and by the appended claim.

In the drawing:—Figure 1 is a plan view of a harrow illustrative of one form of my invention showing one adjustment thereof. Fig. 2 is a similar view showing another adjustment. Fig. 3 is a view in front elevation of the harrow shown in Fig. 1. Fig. 4 is a sectional view on line 4—4 of Fig. 3.

Like characters of reference designate similar parts throughout the different figures of the drawing.

In the form shown, 1 designates frame bars which are longitudinally disposed and which are connected at their forward ends by draft means which are in the form of a draft bar 2. The draft bar 2 is connected with the frame bars 1 by links 3 having hooked ends adapted for engagement with eyes 4. The frame bars 1 are in the form of flat strips having sufficient flexibility to assume lines of curve conforming to undulations of surface over which the harrow is drawn so that all the teeth will at all times engage the surface, as will presently appear. Said frame bars are provided with a plurality of openings 5 which are spaced suitable distances apart longitudinally of said bars. The frame bars 1 are connected in spaced relation with respect to each other by means, which in the present construction, comprises bars 5' and 6, which are pivotally connected with each other between their ends by pivot bolts 7, and the terminal ends of which bars are connected by bolts 8 and 9 in selected openings 5, in the bars 1. The foregoing construction constitutes a harrow frame.

I have shown harrow teeth formed in units of one pair each, the harrow teeth being indicated at 11, and being joined by heads 12. The bars 5' may be formed of angle iron having depending flanges 10, to which the heads 12 may be secured by bolts 13. The teeth, or rather the heads 12 thereof, may be secured in a similar manner to bars 6. The longitudinal frame bars 1 are sufficiently thin and flexible to accommodate themselves to undulating surfaces over which the harrow is drawn so that the harrow will follow a rolling field surface and flex concavely and convexly in serpentine conformity to such surface so that all of the harrow teeth will be active and will have uniform harrowing action.

It is believed that the advantages and utility of my invention will be fully understood from the foregoing description, and while I have herein shown one specific embodiment of my invention, I do not wish to be limited thereto except for such limitations as the claim may import.

I claim:—

A harrow frame including longitudinal frame bars, means connecting said bars in spaced relation with respect to each other, said bars having sufficient flexibility to accommodate themselves to the undulating surfaces over which the harrow is drawn, and harrow teeth mounted on said frame, substantially as described.

In testimony whereof I hereby affix my signature in the presence of two subscribing witnesses.

JOHN MARION McCLAIN.

Witnesses:
WM. C. NELSON,
J. A. HARSH.

Copies of this patent may be obtained for five cents each, by addressing the "Commissioner of Patents, Washington, D. C."